United States Patent [19]

Hennessy et al.

[11] Patent Number: 4,577,756
[45] Date of Patent: Mar. 25, 1986

[54] PROTECTIVE CANISTER FOR COMPUTER DISCS

[76] Inventors: Michael P. Hennessy, 1359 Portsmouth Ct., Carol Stream, Ill. 60788; Andrew B. Prueher, 1016 Sheridan Rd., Highland Park, Ill. 60035

[21] Appl. No.: 604,169

[22] Filed: Apr. 26, 1984

[51] Int. Cl.⁴ .................. B65D 85/30; B65D 45/18
[52] U.S. Cl. .................... 206/444; 206/303; 206/310; 206/404; 211/40; 220/306; 220/326; 292/87; 292/318; 369/280
[58] Field of Search ............ 206/444, 309–313, 206/303, 391, 394, 403, 404, 408; 211/40; 312/9, 10; 220/306, 326; 369/280; 292/318–322, 19, 80, 87–89

[56] References Cited

U.S. PATENT DOCUMENTS

| 394,994 | 12/1888 | Poliwka | 206/303 X |
| 1,239,223 | 9/1917 | Ross | 220/306 |
| 1,344,601 | 6/1920 | Walgren | 220/306 X |
| 3,007,702 | 11/1961 | Eby | 206/309 X |
| 3,208,620 | 9/1965 | Herdering | 220/306 X |
| 3,608,739 | 9/1971 | Duboff | 211/40 |
| 3,670,878 | 6/1972 | Seiler | 206/444 |
| 3,949,872 | 4/1976 | Paudras | 206/310 |
| 4,305,535 | 12/1981 | Brundige et al. | 220/306 X |
| 4,322,841 | 3/1982 | Borchard et al. | 369/280 X |
| 4,434,891 | 3/1984 | Skinner et al. | 206/444 |
| 4,457,429 | 7/1984 | Huber et al. | 206/394 |

FOREIGN PATENT DOCUMENTS 2549932 12/1977 Fed. Rep. of Germany ........ 292/19

Primary Examiner—Allan N. Shoap
Assistant Examiner—Bryon Gehman
Attorney, Agent, or Firm—Hill, Van Santen, Steadman & Simpson

[57] ABSTRACT

A protective canister for computer discs comprises a hollow tube and a pair of end caps for closing the tube and fixing a central post therein. A stack of alternate computer discs and spacers having aligned central apertures is loaded onto the center post and clamped in the canister by way of a pair of platforms carried by the end caps about the central post. The elements of the canister are preferably constructed from hydrocarbon-based polymers and, after loading, the canister is sealed in shrink film so that the discs are protected in an environment which is free of particulate matter.

8 Claims, 13 Drawing Figures

U.S. Patent  Mar. 25, 1986  Sheet 1 of 3  4,577,756
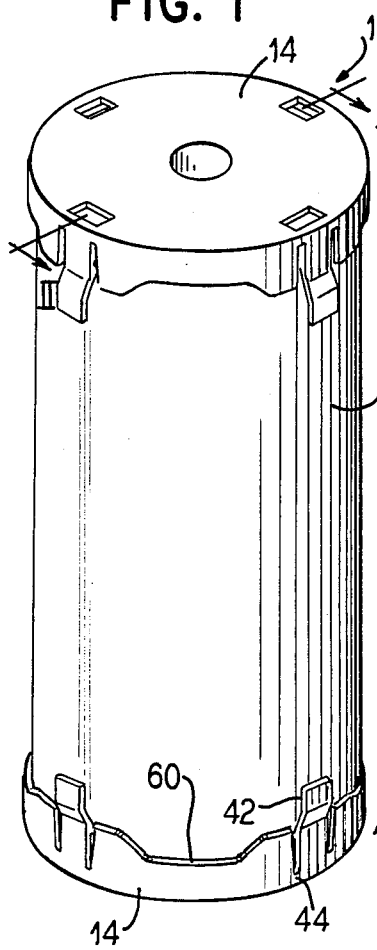
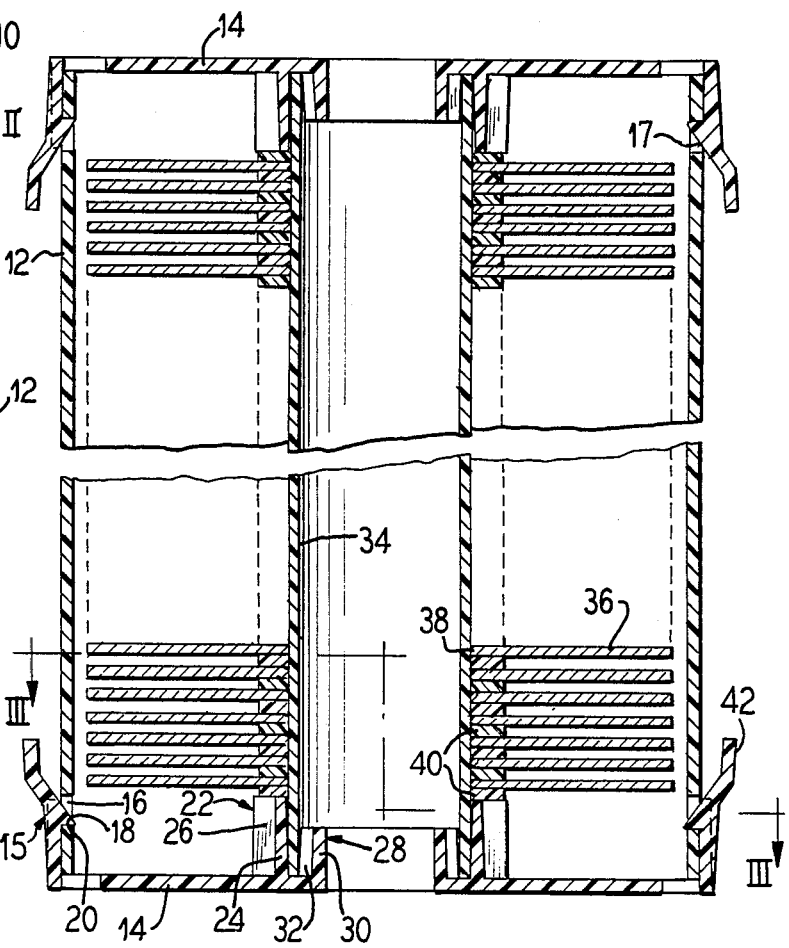
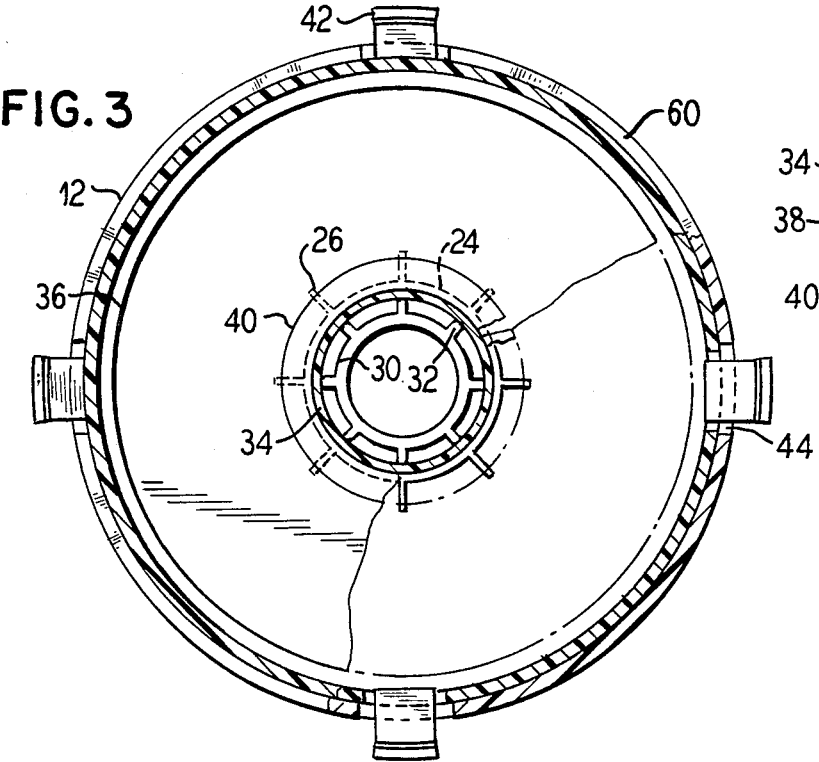

PROTECTIVE CANISTER FOR COMPUTER DISCS

BACKGROUND OF THE INVENTION

1. Field of the Invention

The present invention relates to packaging techniques for computer discs, and is more particularly concerned with the provision of a protective canister for transporting the computer discs.

2. Description of the Prior Art

Although the present invention provides a protective canister which was designed for a particular size of disc, for example a 5¼" rigid disc, such as aluminum, the package may be resized for other sizes of discs.

Presently, computer discs are milled at a first facility and then undergo further processing, including for example, polishing and receiving an application of magnetic material for storing information, usually at a second facility. During the entire process, the disc may be protected from contamination. This is particularly true during packaging and shipment of the disc from one facility to another.

A previous package comprised a rigid base having a plurality of spaced posts extending therefrom sized to closely receive the central apertures of the discs to form a plurality of stacks of discs with flat spacer rings therebetween. A second rigid base is secured to the free ends of the post and the resultant structure is sealed in a cardboard box. The bases and the posts were usually wood. It has been determined, however, that the paper and wood generate particulate matter which contaminates the discs and makes them useless.

It is general practice to mill and package the discs in clean rooms; therefore, contamination can only come from mishandling or from the package itself.

SUMMARY OF THE INVENTION

It is therefore the object of the present invention to provide a package for transporting computer discs, which package provides physical protection in a contamination-free environment.

According to the invention, the package comprises a cylindrical tube having open ends which are closed by end caps. The diameter of the tube is greater than the outer diameter of the disc, so as to provide sufficient spacing therebetween. The end caps are provided with resilient latches which engage latch apertures in the tubes. The latches may be flexed for disengagement; however, inasmuch as the canister will probably not be used again, the latches are joined to the end caps by frangible sections so that the same may simply be broken away. Releasably secured to the end caps and positioned thereby coaxial with the longitudinal axis of the tube is a central post, here also in the form of a hollow tube. A post mount in each end cap frictionally engages and secures the central post.

Concentric with the central post, and provided on each end cap, is a platform for engaging the last spacer ring on each end of a stack of alternate computer disc and rings. When the stack is loaded and the end caps latched to the outer tube, the platforms clamp the stack therebetween.

According to a particular feature of the invention, the entire package is constructed of materials which do not generate particulate matter. Such materials may include hydro-carbon-based polymers such as polystyrene, polypropylene, ABS plastics and the like.

A disc of the type mentioned above stores information on tracks which are spaced so that there are 900 tracks per inch, for example. Therefore, the contamination provided by the spacer rings must be held to a minimum. In a first embodiment, the spacer rings contact a small surface area, for example 0.250" about the central aperture. Even this small surface area will constitute approximately 450 tracks of loss data storage when one considers both sides of the disc. In a preferred embodiment of the invention, there is essentially zero loss in that the spacer ring is constructed to be complemental to the inner diameter of the central aperture and a bevel surface which extends between a main surface and the inner diameter of the central aperture.

The spacer of the first embodiment is a flat ring of, for example, polypropylene, whereas the spacer of the preferred embodiment is a ring which supports a plurality of arcuate projections, alternate ones of which face in opposite directions along the direction of the axis of the post. Each of the projections comprises an L-shaped cross section as viewed in radial section with a first leg for entering and engaging the inner diameter of a central aperture and a second leg with a bevel surface matching that of the bevel surface of a disc. Therefore, the main surface of a disc is not contacted and is therefore not contaminated.

According to another feature of the invention, loading and unloading is facilitated by providing minimum friction between the spacers and the central post while maintaining centering of the spacers. This is accomplished by providing a surface of the spacer rings in the form of raised lands spaced about the inner surface. The lands may be raised, for example, 0.005–0.010" so that the inner diameter is reduced on the order of 0.010–0.020".

In order to further protect the disc during shipment, the entire loaded canister may be sealed, for example by enclosing the same in shrink film. Afterward, more conventional packaging may be employed.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a pictorial representation of a canister for protecting computer discs;

FIG. 2 is a sectional view taken along the line II—II of FIG. 1 and illustrates a loaded canister using the previous style of spacer, but useable with a new style of spacer as shown in FIG. 7;

FIG. 3 is a sectional view taken generally along the line III—III of FIG. 2;

FIG. 4 is an enlarged fragmentary sectional view illustrating the alternate stacking of the previous style spacers and discs on the central post;

DESCRIPTION OF THE PREFERRED EMBODIMENTS

Figure 5:
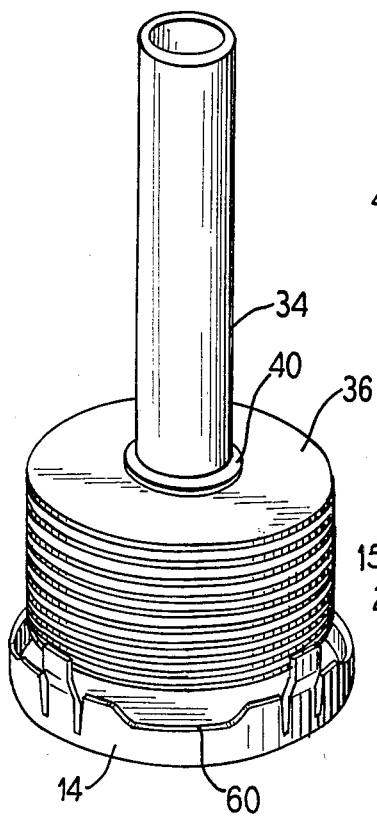
FIG. 5 is a pictorial representation of the use of an end cap as a stand for the central post for loading and unloading computer discs and spacer rings.
Figure 6:
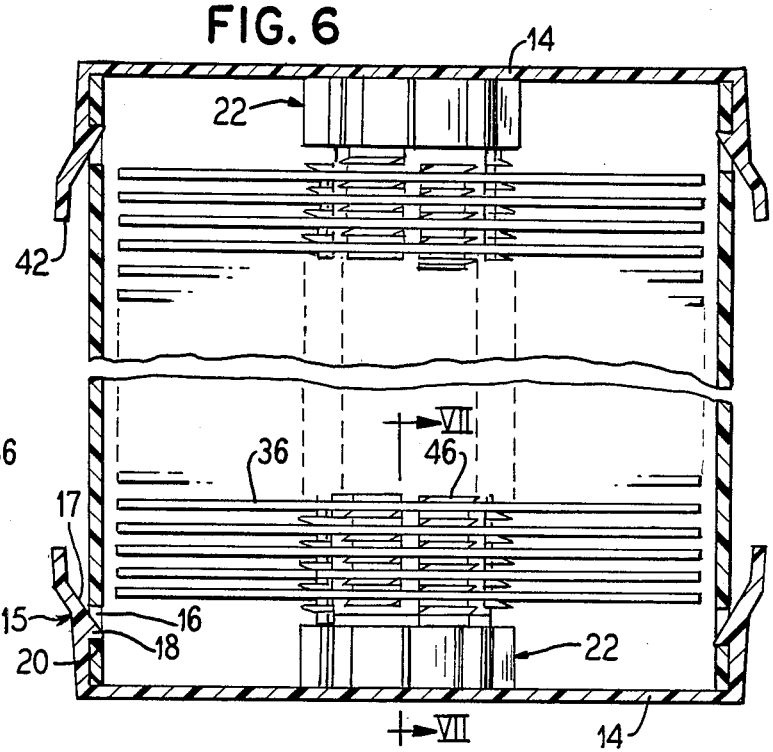
FIG. 6 is a sectional view similar to that of FIG. 2 and illustrating the utilization of a preferred embodiment of a spacer ring.

Referring to FIGS. 1-4, a protective canister is generally illustrated at 10 as comprising a hollow tube 12 and a pair of end caps 14 which releasably engage the tube 12, as will be discussed in detail hereinbelow.

At each end of the tube 12 is a plurality of spaced latch apertures 16 each including a latch edge 18 which engages a hook surface 20 of a latch 15 when an end cap is in position. As the end cap is moved into position, a ramp surface 17 engages the end of the canister and flexes the latch 15 outwardly as the end cap is moved into place. When the end cap is in place, as illustrated, the surfaces 18 and 20 are engaged.

In the central area of an end cap 14 is a pair of molded structures for supporting the central post 34, here a hollow tube, and for supporting a plurality of discs and spacers as alternate members of a stack. The central post 34 is placed over and receives a post mount 28 which includes a ring body 30 and a plurality of radially-extending friction reducing and strengthening fins 32. The post 34 is centered by this structure and retained in a friction fit.

Concentrically about the post mount 28 is a platform 22 which comprises a ring 24 and a plurality of radially-extending fins 26 which strengthen the structure and support the stack.

As is evident from FIG. 2, the end caps are of identical structure so that the post 34 is held fixed in a central position. As is also apparent, the tube 12 is of larger inner diameter than the outer diameter of the disc 36 so that there is no contact therebetween when the package is completed. Furthermore, the platforms 22 serve to clamp the stack therebetween with each disc having a spacer 40 on each side thereof. As is evident, a spacer contacts an adjacent disc over a small surface area about the central aperture.

The tube 12 could have one end sealed and one end open to be closed with an end cap. In such a structure, the spacers and discs would be alternately loaded over the center post 34, and the end cap would then be used to close the canister. However, and as illustrated in FIG. 5 the canister may be loaded by employing an end cap 14 as a base or stand for the post 34. The spacers and discs may then be loaded over the post and the tube 12 and the other end cap 14 may then be placed over the stack with care being taken to avoid contact between the tube 12 and the discs 36.

Although the spacer 40 contacts a disc 36 over but a small surface area so that the same become contaminated and unusable in this small area for purpose of data storage, such an area constitutes a great loss of data capacity. In order to at least minimize and preferably eliminate this loss, the minimization or elimination of contamination in this area is desirable. Therefore, we have taken steps to accomplish the same and present a canister for this purpose in FIGS. 6-9.

Figure 8:
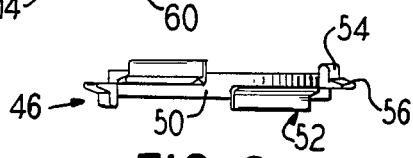
FIG. 8 is an elevation of the spacer ring employed in the structure of FIG. 6.
Figures 9, 10:
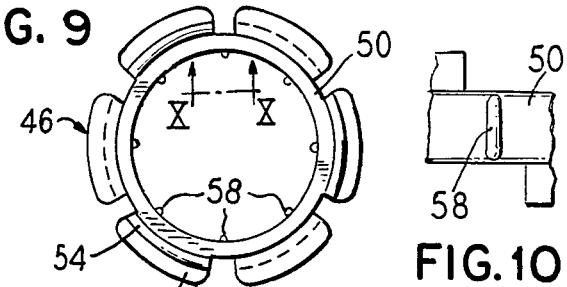
FIG. 9 is a top view of the spacer of FIG. 8.
FIG. 10 is a fragmentary view, taken generally along the line X—X of FIG. 9, illustrating the inner surface structure of the preferred spacer ring.
Figure 7:
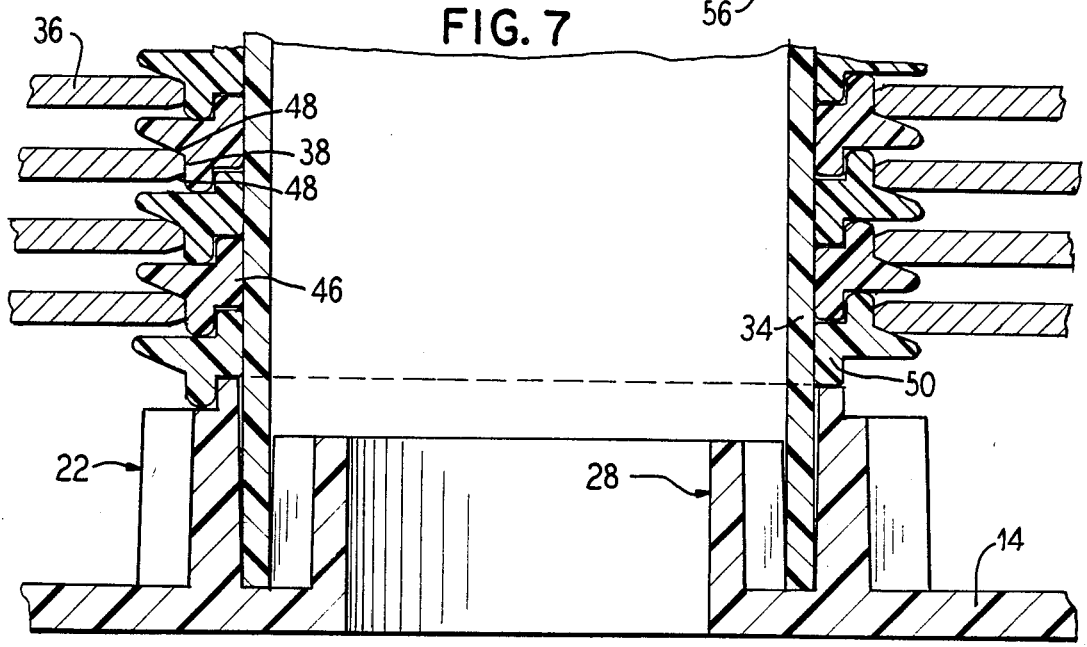
FIG. 7 is an enlarged fragmentary sectional view taken generally along the line VII—VII of FIG. 6.

Turning now to FIGS. 6-9, a canister with a preferred embodiment of a spacer is illustrated in which the hollow tube 12, the end caps 14, the post 34, the post mount 28 and the platform 22 are the same as in FIG. 2. The difference is in the provision of a spacer 46 which has a shaped structure so as to avoid contact with the main surfaces of the discs. As best seen in FIG. 7, a pair of bevel surfaces 48 extend from respective main surfaces of a disc to the inner diameter of the central aperture 38. The angle of bevel may be, for example, 21°. We now provide a spacer 46 which contacts only the inner diameter of the disc and the bevel surface of the disc so that the entirety of each main surface is available for data storage. The preferred spacer 46 is best seen in FIGS. 8 and 9 as comprising a ring 50 and a plurality of arcuate projections 52 on each side of the ring 50. Each arcuate projection 52 is generally L-shaped as viewed in radial section and comprises a first leg 54 which extends into and engages the inner diameter of the aperture 38 and a second leg 56 shaped complemental to and for engaging a bevel surface 48. Therefore, as the stack is constructed, only the inner diameter of an aperture and the bevels are contacted by any structure and the main surfaces of the discs remain free from contamination.

It should be noted that the first leg 54 is spaced so as to nest between the outer surface of the central post 34 and the body of the ring 50 and to abut the adjacent spacer at the body of its ring.

Referring to FIGS. 9 and 10, the inner surface of the ring 50 is provided as a profiled surface and includes a plurality of spaced lands 58 which provide minimum frictional contact with the center post 34 and maintain centering of the spacer with respect to the center post. Therefore, loading and unloading are facilitated.

After a canister is loaded, the discs are further protected from external contaminant particles by enclosing the entire canister in a shrink film.

Afterward, more conventional packaging techniques may be employed for transporting the canisters to another facility for further processing into completed discs.

At such a further facility, the discs may be removed in a reverse procedure by unlatching the end caps and the hollow tube 12. If the canister is not to be reused and this is usually the case, the latches may be provided as frangible structures. Returning to FIGS. 1 and 2, each latch hook is illustrated as comprising a tab 42 which is positioned spaced from the hollow tube 12 so that it may be grasped between a thumb and index finger, for example, and bent outwardly. Each latch hook is connected to its end cap by a pair of small frangible sections 44 which break upon flexing of the hook beyond the yield point of the material.

In summary, we have provided a canister for protecting computer discs. In one embodiment, the canister employs spacers which contact only small surface areas about the apertures of the computer discs. In a preferred embodiment, we have provided that the small surface area be a bevel surface about the aperture, which bevel surface is not employed for data storage, so that the entire main surfaces of each disc are available for data storage.

Figure 11:
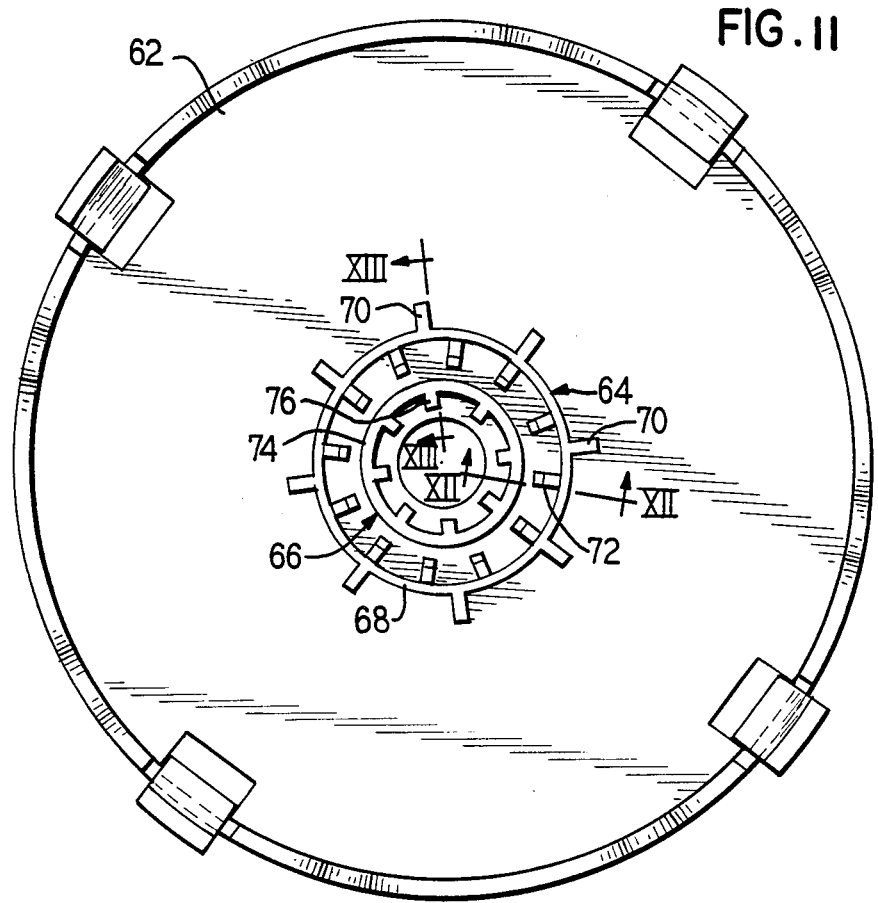
FIG. 11 is a view, similar to that of FIG. 3, showing an end cap for receiving two different sizes of posts to accommodate discs having different sizes of central apertures.
Figure 12:
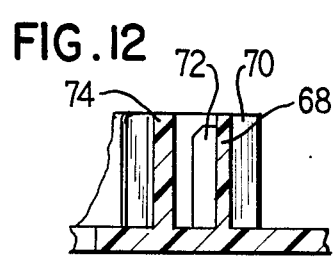
FIG. 12 is a fragmentary sectional view taken along the line XII—XII of FIG. 11.
Figure 13:
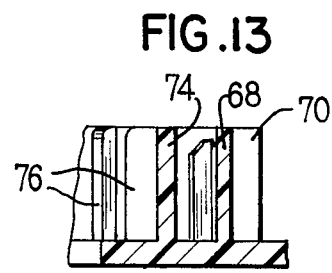
FIG. 13 is a fragmentary sectional view taken along the line XIII—XIII of FIG. 11.

Referring now to FIGS. 11, 12 and 13, a further embodiment of an end cap is illustrated for accommodating a central post of a first size and a central post of a second size so that the canister may be employed for protecting and transporting discs having different sizes of central apertures. For example, a 3.5" disc may have the same aperture as the above-discussed 5" disc, for example 1½" diameter, or a smaller aperture diameter of, for example, ¾" diameter. In order to be able to protect and transport both types of discs, a central post of a corresponding diameter may be selected and mounted to the end caps. It has been determined that during the extrusion process of the hollow tubes which form the central posts, there is a greater control of the outer diameter. In this embodiment, therefore, it is the outer diameter of the tube which is engaged by the supporting structure. In this embodiment, a first structure 64 is provided for receiving a tube of a first diameter and a second structure 66 is provided for receiving a tube of a lesser diameter.

The structure 64 comprises a ring 68 extending from the end cap 62 and a plurality of radially-extending members 72 whose free ends define the outer diameter of the tube to be received. The second structure 66 similarly comprises a ring 74 having a plurality of radially inwardly extending members 76 whose free ends define the outer diameter of the tube to be received. As illustrated, a plurality of strengthening members 70 may be provided; however, the first and second structures 64 and 66 should provide suitable rigidity.

As illustrated in FIG. 12, the members 72 are recessed and beveled so as to receive a corresponding portion of the new style of spacer ring.

A spacer ring of the same design may be employed on the second structure 66; however, it is not intended that this ring be received within the structure 66, but rather rest on top of the structure 66.

Turning once again to FIGS. 1, 3 and 5, and to FIG. 11, the cap 14 is illustrated as comprising a plate having a peripheral edge extending therefrom, the peripheral edge including a plurality of recesses 60. The recesses 60 are provided spaced about the cap so that one may have access to the last disc of the stack when the disc are unstacked for further processing.

Although we have described our invention by reference to particular illustrative embodiments thereof, many changes and modifications of the invention may become apparent to those skilled in the art without departing from the spirit and scope thereof. We therefore intend to include within the patent warranted hereon all such changes and modifications as may reasonably and properly be included within the scope of our contribution to the art.

We claim:

1. A protective canister for protecting a plurality of computer discs of the type having a pair of opposite main surfaces, a central aperture and a pair of bevel surfaces each extending from a respective main surface into the central aperture, said canister comprising:
   a hollow tube including two ends;
   a pair of caps for closing said two ends;
   cooperable latch means on said two ends and on said caps for securing said caps to said ends;
   a post and post mounting means carried by said caps for holding said post centrally within said hollow tube, said post including a cross-sectional dimension slightly smaller than that of the aperture of a disc to receive the discs thereover in a stack;
   a platform on each of said caps about said post;
   a plurality of spacer rings for placement over said post between adjacent discs in the stack and between each end disc of the stack and the respective platform, each of said rings comprising a ring body and a plurality of arcuate projections extending from each side of said ring body, each of said arcuate projections being generally L-shaped as viewed in the radial direction including a first leg for extending into and engaging the inner diameter of the central aperture and a second leg carrying a support surface for engaging a respective bevel surface; and
   said hollow tube and said post including lengths such that the stack of computer discs is clamped against movement when said caps are latched to said hollow tube.

2. The protective canister of claim 1, wherein:
   each of the recited elements consists of material which does not generate particulate matter.

3. The protective canister of claim 2, wherein:
   said material comprises a hydrocarbon-based polymer.

4. In a protective package for protecting computer discs having opposite main surfaces, a central aperture and a pair of bevel surfaces extending from the main surfaces into the central aperture, in which spacer rings are alternately positioned between the discs to form a stack positioned by a central post through the rings and discs and mounted within a container by a pair of n structures, the improvement wherein:
   each of said rings comprises at least one surface on each side thereof for engaging only the bevel surface of a respective disc;
   each of said rings comprises a ring body and a plurality of arcuate projections extending from each side of said ring body; and
   each of said arcuate projections being generally L-shaped as viewed in radial section and including a first leg for extending into engagement with the inner diameter of the central aperture of a disc and a second leg carrying a support surface complemental to a bevel surface for engaging a bevel surface,
   said support surface constituting said at least one surface on each side of the ring.

5. The improved protective canister of claim 4, wherein:
   said ring body includes a predetermined thickness;
   said first leg is connected to and offset from said ring body by an amount greater than said predetermined thickness; and
   said ring body of a ring nests within the offset of an adjacent ring when the stack is formed.

6. The improved protective canister of claim 4, wherein:
   said ring body comprises an inner profiled surface including a plurality of spaced lands for centering the ring about and providing a low friction contact with the central post.

7. A spacer ring for receiving a post therethrough and spacing a pair of discs, each of the discs having a pair of main surfaces, a central aperture for receiving the post, and a pair of bevel surfaces each extending from a respective main surface into the central aperture, said spacer ring comprising:
   a ring body; and
   a plurality of arcuate projections extending from each side of said ring body,
   each of said arcuate projections being generally L-shaped as viewed in radial section and including a first leg for extending into and into engagement with the inner diameter of a central aperture of a disc, and a second leg carrying a surface complemental to and for engaging a bevel surface of a disc.

8. The spacer ring of claim 7 wherein:
said ring body comprises an inner profiled surface including a plurality of spaced lands for centering the ring about and providing a low friction contact with a centering post.

* * * * *